United States Patent [19]

Jha et al.

[11] Patent Number: 5,232,679
[45] Date of Patent: Aug. 3, 1993

[54] PROCESS FOR PRODUCTION OF VALUE-ADDED COPRODUCTS FROM COAL AND OTHER CARBONACEOUS MATERIALS

[76] Inventors: Mahesh C. Jha, 7891 Everett Way, Arvada, Colo. 80005; Paul W. Woessner, 4404 Broadway, Indianapolis, Ind. 46205

[21] Appl. No.: 354,606
[22] Filed: May 22, 1989
[51] Int. Cl.$^5$ .......... C01B 31/04; C09C 1/48
[52] U.S. Cl. .................. 423/449; 423/445; 201/37; 208/408
[58] Field of Search ............... 423/445, 449, 460, 461; 208/408, 424; 201/37

[56] References Cited

U.S. PATENT DOCUMENTS 3,375,175  3/1968  Eddinger et al. ............ 201/37
3,773,904  11/1973  Iyengar et al. .............. 423/449
3,988,236  10/1976  Albright et al. ............. 208/408

OTHER PUBLICATIONS

Steinberg, *Coal Slurry Fuels Preparation and Utilization*, 5/30/86, pp. 291–302.
Steinberg, *Hydrogen Systems*, 5/11/85, pp. 217–228.
Olsen, *Unit Processes and Principles of Chemical Engineering*, 1932, pp. 1–3.

Primary Examiner—Gary P. Straub
Assistant Examiner—Stephen G. Kalinchak

[57] ABSTRACT

Coal is heated between about 95° and 250° C. to evaporate moisture, but not volatile hydrocarbons. The dried coal is heated to a temperature between about 400° and 700° C. to recover volatile hydrocarbons and to form char, the char is treated with hydrogen at a temperature between about 700° and 1000° C. to form methane, and the methane is decomposed to form pure carbon and hydrogen, which is recycled to treat the char.

6 Claims, 1 Drawing Sheet

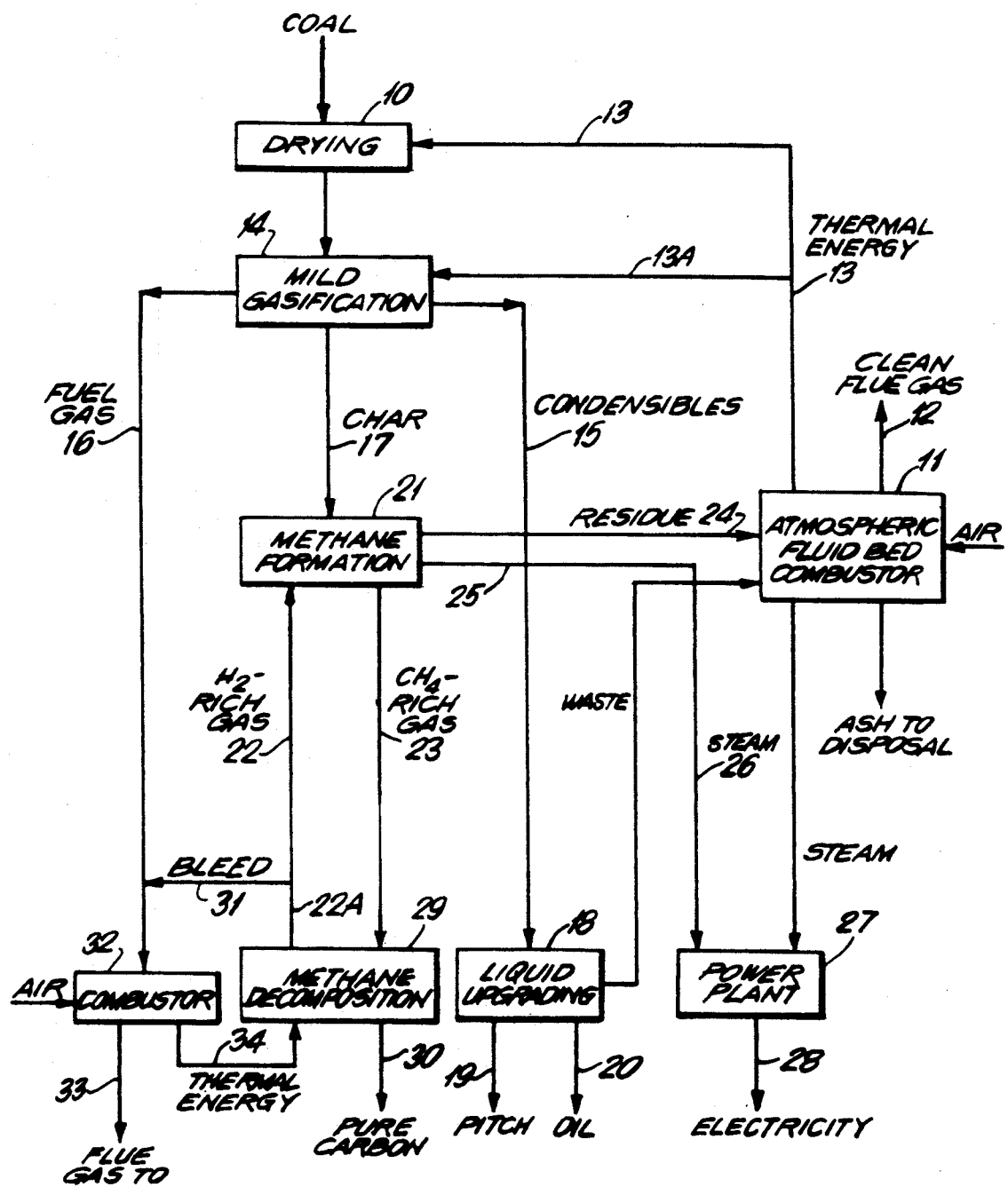

PROCESS FOR PRODUCTION OF VALUE-ADDED COPRODUCTS FROM COAL AND OTHER CARBONACEOUS MATERIALS

This invention relates to a process for the production of value-added coproducts from coal and other carbonaceous materials for use in providing energy, and for use in chemical and metal markets.

STATE OF THE ART

There is an acute awareness in the public and private sector on expanding the usage of coal as a primary source of energy. Since coal is already a major fuel for the utility industries, the interest is being focused on other sectors, particularly transportation and industrial sectors, in which coal-derived products can substitute for petroleum-derived products.

Coal represents the largest source of fossil energy in the U.S.A. and many other industrialized countries of the world. Its use, however, has been limited to large power plants because of its physical and chemical characteristics, mainly its solid form, and a wide variation in its chemical composition and heating value. Even in this application, coal suffers from a major drawback, that is the presence of impurities such as sulfur and mineral matter which add significantly to the cost of using this inexpensive fuel in an environmentally acceptable way. The term "coal" used herein is understood to include many carbonaceous materials which may be processed in a similar manner.

To overcome these problems and to expand the usage of coal in other energy and non-energy (particularly chemical) markets, several processes have been developed that convert the carbon and hydrogen values from coal into hydrocarbons in liquid or gaseous forms. These processes, which are generally referred to as liquefaction and gasification, usually operate at very high temperatures and pressures and consume expensive hydrogen or oxygen to produce products similar to petroleum or natural gas. Because of the large capital involved in construction of such plants and the relatively low value of these products in the energy markets, commercialization of coal gasification and coal liquefaction processes have been limited, particularly in the United States.

As an alternative, investigations are being conducted by government agencies utilizing a concept called mild gasification with the object of recovering most of the volatile content of the coal as gaseous and liquid products under relatively mild conditions of temperature and pressure without using hydrogen or oxygen. In such a process, most of the carbon remains behind as char.

Technical and economic evaluations performed by the U.S. Dept. of Energy (DOE) and its contractors indicate that this technology can be commercially viable only if it produces a slate of value-added coproducts capable of being sold in the energy and non-energy markets at prices significantly higher than that paid for the parent coal.

It would thus be desirable to provide in a system of coal treatment a process for producing value-added products for the energy and chemical markets starting from coal and other carbonaceous materials.

OBJECTS OF THE INVENTION

One object of the invention is to provide a process for producing value-added coproducts from coal.

Another object is to provide a process which operates at relatively mild conditions of temperature and pressure, which does not consume expensive reagents like hydrogen or oxygen required in other coal conversion technologies, and which utilizes a novel combination of operational steps to minimize waste by-products and maximize energy efficiency, including production of electricity as a by-product.

A further object of the invention is to provide a process for upgrading the char produced by mild gasification or pyrolysis of coal or other carbonaceous materials to pure carbon for use, by way of example, as carbon black for rubber compounding and other similar applications, as carbon electrodes for aluminum production and other similar electric furnace processes, and as a premium fuel (ash, moisture, and sulfur free) for heat engines (gas turbines and diesel engines) and boilers, and the like.

These and other objects will more clearly appear from the following disclosure, the claims, and the appended drawing.

DESCRIPTION OF THE DRAWING

The drawing is a flowsheet illustrating one embodiment of the invention.

STATEMENT OF THE INVENTION

A process has now been developed which enables the production of value-added products for the energy and chemical markets starting from coal and other carbonaceous materials. The process depends upon mild gasification of coal to recover most of its volatile content as condensibles which are upgraded to pitch and oil. The hot char is transported to a second process where it is converted to pure carbon. These two processes have been combined in a novel way to maximize energy efficiency, minimize waste disposal, and produce electricity as another major coproduct.

The invention is based on the principle that coal consists of several major constituents such as moisture, volatile matter, fixed carbon, and mineral matter which respond differently when coal is heated to higher temperatures in non-oxidizing atmosphere. In the present process, each of these constituents is removed selectively and sequentially under conditions that are best for the particular process step employed.

Removal of moisture, which may be as high as 30 percent or more in lower rank coals, is desirable before any further processing is carried out. While the water removed from coal would have no value, it is important to realize that the presence of organic contaminants in the water may involve a significant cost penalty because these contaminants must be removed before the water can be discharged from the plant into the environment.

The first step in carrying out the process is to dry the coal to remove most of the moisture prior to processing. The drying must be performed at temperatures high enough to obtain fast removal of water but not so high as to remove the volatile matter which would contaminate the condensate. The temperature employed would preferably range from about 95° C. to 250° C.

Following removal of water, the next constituent to be removed is volatile matter. The amount present may vary in the range of about 15 to 45 percent, depending upon the nature of the coal. It is possible to remove most of the volatile matter by heating the coal in a non-oxidizing atmosphere at a temperature in the range of about 400° C. to 700° C. The composition of vapors released by heating this coal will vary with the feedstock composition and the degree of heating. Part of the vapors will be condensible, yielding a coal liquid product comprising mostly hydrocarbons but also containing oxygen and small amounts of nitrogen and sulfur. The balance will generally comprise a medium to high BtU fuel gas containing hydrogen, methane, carbon monoxide, and carbon dioxide as major constituents and hydrogen sulfide, depending on the sulfur content of the coal.

A variety of reactor design and process conditions can be used, depending upon the quantity and quality of the liquid and gaseous products to be recovered from a particular coal. A continuous fluidized-bed reactor is preferred in that it can rapidly and uniformly heat the drying coal.

Both drying and mild gasification operations require large amounts of thermal energy. In the process of the invention, the energy is provided within the system by recirculating gas streams that are heated in an atmospheric fuel combustion system which is capable of burning all the waste solid, liquid, and gaseous streams from the plant.

The heart of the process of this invention is the char to carbon reactor where char from the mild gasification process is converted to pure carbon.

The char to carbon process is based on well known chemistries for converting char to methane and methane to carbon. In the first step, carbon is removed from the char by adding hydrogen and converting it to methane gas and residuals, according to Reaction 1. Some of the sulfur in the process is converted to hydrogen sulfide in accordance with reaction IA. Ash, unreacted carbon and some sulfur remain as a solid and the solid removed with ash waste for disposal.

$$S + H_2 \rightarrow H_2S \tag{1A}$$

$$C + 2H_2 \rightarrow CH_4 \tag{1}$$

After removing any particulate matter, the methane gas is decomposed at a higher temperature in a second reactor to produce carbon particles and hydrogen gas, according to Reaction 2. Heat must be added to the process in various ways to force the production of carbon.

$$CH_4 \rightarrow C + 2H_2 \tag{2}$$

The hydrogen produced in Reaction 2 is recycled as feed hydrogen to Reaction 1. As will be appreciated, no reagent is consumed in the process. While heat is consumed in one step, it is produced in another. Thus, the success of this process depends on the elegant chemistry and the novelty of process design which permits efficient removal of heat from one reactor (at lower temperature) and efficient provision of heat to another reactor (at higher temperature).

In this aspect the process of the invention is novel and superior to those proposed in the prior art. Heat is recovered from the first reactor as steam, which is then converted to electric power utilizing standard commercial technology. The required heat for the second reactor is provided by burning the fuel gas produced during mild gasification and a bleed stream of recirculating hydrogen-methane mixture that also controls buildup of gaseous impurities in this stream.

Pure carbon produced by this process is a high value product for the chemical market. Carbon black, traditionally produced from natural gas and petroleum, is used in rubber compounding and various other applications such as ink, paints and pigments, electronics, etc. High purity carbon is also a feedstock for the manufacture of carbon electrodes that are used in electrolytic production of metals, such as aluminum, magnesium, and steel and of nonmetals, such as phosphorus.

In the future, the largest use for pure carbon powder produced by the process may be as a premium fuel for gas turbines and boilers. Since it contains no objectionable impurities, such as moisture, ash, and sulfur normally associated with coal, carbon can be used as a fuel for heat engines without the requirement for complex combustion systems, or environmental cleaners. In all these applications, carbon as a premium fuel would provide a high Btu pollution free fuel and could change the manner in which coal is currently being burned on a world wide scale.

DETAILS OF THE INVENTION

The appended drawing is illustrative of a preferred embodiment of the invention showing how various products can be produced from coal. The process is well suited for almost all coals in the United States with minor modifications in operating conditions. The following example is based on a subbituminous coal with a typical composition shown below:

| | |
|---|---|
| % Moisture | 30 |
| % Volatile Matter | 30 |
| % Fixed Carbon | 35 |
| % Ash and Sulfur | 5 |

MILD GASIFICATION PROCESS

The coal is preferably heated to a temperature in the range of about 200° to 400° F. (about 95° C. to 205° C.), preferably in a fluidized-bed reactor 10 to remove most of the moisture from the coal. The moisture content of the dried coal may range from about 1 to 10 percent, the lower the better. An important process consideration is to avoid such high temperatures or residence time which will be conducive to the removal of volatile matter. The purpose is to produce a water vapor stream, with minimum (preferably without) contamination of organic matter, so that it may be disposed in the environment or used in the plant without any expensive water treatment. The large amount of thermal energy necessary for drying application is provided by a combustion system 11. Hot flue gas 12 from the combustion system may be used directly to fluidize and heat the coal in the dryer; or a recycle gas stream via line 13, after separation of water, can be heated in the combustion system and then used in dryer 10.

Dry coal enters the mild gasification reactor 14 for devolatization to remove most of the volatile matter. This reactor may be a single-stage fluid-bed reactor operating at a temperature in the range of 800° F. to 1,200° F. (about 425° C. to 650° C.), or a staged reactor system in which the temperature is increased from a low of about 800° F. (about 425° C.) in early stages to a high of about 1,200° F. (about 650° C.) in the final stages. Under these conditions, most of the volatile matter is removed from the coal. These organic vapors are cooled to produce the condensibles 15, as shown in the appended flowsheet, and the remaining gas is heated indirectly in the combustion system before returning via line 13A to the mild gasification reactor 14 as the fluidizing and heating medium. A bleed stream 16 of this gas is removed as the fuel gas product, amounting to about 7 percent of the raw coal feed. Char 17 is obtained as a by-product residue. Typical analysis of the gas from a subbituminous coal is generally as follows:

| Composition | Volume percent |
| --- | --- |
| Carbon Monoxide | 10 |
| Hydrogen | 25 |
| Methane, Other Hydrocarbons | 50 |
| Carbon Dioxide | 15 |

The gas has very good heating value, over 700° Btu/SCF, which may be used as a source of clean thermal energy for high purity carbon production in the char to carbon process described hereinafter.

The condensibles 15, which would represent about 15 to 25 percent of the raw coal feed, are separated and upgraded at 18 to two types of commercial products represented by pitch 19 and oil 20 as shown in the flowsheet. Pitch is the heavier fraction, which usually becomes solid at temperatures below about 115° F. (about 42° C.). It does not contain any fraction that would distill off at temperatures below about 500° F. (about 260° C.). Thus, it is useful in a variety of applications where it is used as a liquid in the temperature range of about 150° to 450° F. (about 60° C. to 233° C.) and then allowed to cool and solidify. Major applications are as binders for carbon electrodes used in aluminum and other electric furnaces, as a roof cover, as a spraying agent for dried coal, and as road surfacing material.

The lighter fraction, designated as oil in the flowsheet, can be processed further for recovery of valuable chemicals such as benzene and phenol or for the production of high octane transportation fuels. Alternatively, with minimum upgrading, it could be blended with diesel fuels to run heavy equipment. The oil can also be sold as fuel for boilers or gas turbines.

The solid residue or char 17 leaving the mild gasification reactor represents about 35 to 60 percent of the weight of raw coal in the case of low rank coals and >50 percent in the case of high rank coals. The char to carbon process converts this char to highpurity carbon, which is an important part of this invention.

Char To Carbon Process

The conversion of char to carbon is accomplished in two steps. In the first step, methane formation step 21, carbon in the char reacts with a hydrogen rich gas 22 at temperatures of about 1,300 to 1,800° F.(about 700° C. to 1000° C.) to form methane 23, according to Reaction 1 described hereinbefore. A moving bed or fluid-bed reactor can be used for methane formation. By properly controlling the temperature, pressure, gas composition, and residence time, it is possible to convert most of the carbon present in the char to methane gas ($CH_4$). Any unconverted carbon and the ash 24 as residues are separated from the gas by such commercially available devices as cyclones and high temperature filters and sent to the combustion system unit 11. The methane formation is a very strongly exothermic reaction, and this excess energy 25 is recovered and may be used to generate steam 26 which is then converted to electricity 28 in a power plant 27 on site.

In the second step of the process, called methane decomposition, the clean methane rich gas is heated to temperatures above 2,000° F. (about 1095° C.) at 29 to form fine particles of pure carbon 30 and hydrogen 22A, according to Reaction 2 discussed hereinbefore. This reaction can be accomplished in a 2-reactor system such as used in the thermal black process for producing carbon black from natural gas. Alternately, a continuous indirect heat exchanger may be used to accomplish the thermal decomposition of methane.

The hydrogen and carbon-rich gas from the second step is cooled and then passed through filters to separate and collect the pure carbon particles. Process variables such as temperature, residence time, and seed recycle are coordinated to control the particle size of the product based on the market requirement. Three major uses of the carbon product are:

1. Carbon black for rubber compounding for the tire and non-tire markets;
2. Carbon for electrodes for electrolytic production of aluminum and other metals, as well as non-metals; and
3. Carbon as a premium fuel (ash, sulfur, and moisture free), for gas turbines and boilers.

The hydrogen-rich gas will be returned to Step 1 where it will be used to convert additional char to carbon. Thus, no reagent is consumed in this process, regardless of the amount of ash present in the coal.

It is important that the heat for the endothermic carbon production reaction be provided in a clean form so that a carbon product is provided at high purity. In the present process, this heat is provided by burning the fuel gas produced in the mild gasification reactor. To supplement this heat, if necessary, a bleed stream 31 of recirculating, hydrogen-rich gas can be burned at combustor 32, as shown in the flowsheet. Bleed stream 31 will be necessary if the char being fed to the methane formation reactor contains some excess hydrogen because of its incomplete volatilization in the mild gasification reactor 14. The bleed stream will also provide a means of controlling buildup of any impurity such as hydrogen sulfide in the recirculating gas loop.

The flue gas 33 from combustor 32 will be routed through the combustion system 11 and sulfur will be captured. The thermal energy 34 produced by the combustor may be utilized for methane decomposition. The excess heat from the combustion system may be used to generate steam, which in turn will produce electric power. It is estimated that 1,000 ton coal/day plant will be able to produce annually about 60,000 MWh.

The only waste products leaving the plant will be ash from the combustion system, which is based on well established coal combustion technology. The gas leaving the combustion system will comprise substantially nitrogen and carbon dioxide.

Although the present invention has been described in conjunction with preferred embodiments, it is to be understood that modifications and variations, such as feeding coal or dry coal directly to the char to carbon process, may be resorted to without departing from the spirit and scope of the invention as those skilled in the art will readily understand. Such modifications and variations are considered to be within the purview and scope of the invention and the appended claims.

What is claimed is:

1. In a system for the production of value-added coproducts from coal, the process which comprises:

subjecting coal to a drying treatment as a first stage by heating said coal to a temperature of about 95° C. to 250° C. and for a time sufficient to remove substantially only moisture therefrom, treating said dried coal in a second stage by heating it to an elevated temperature of about 400° C. to 700° C. under non-oxidizing conditions sufficient to remove volatile matter therefrom and produce fuel gas and condensible matter comprising pitch, oil and char, condensing said condensible matter to form said pitch and oil, converting said char to methane in a third stage by treating said char with hydrogen at a temperature of about 700° C. to 1000° C. and pressure conducive to methane formation and thereby leave a combustible residue thereof, thermally decomposing said methane to form pure carbon and hydrogen, and subjecting said residue remaining from the hydrogen-treated char to combustion to produce thermal energy for recycle into said system.

2. The process of claim 1, wherein the fuel gas formed during mild gasification is passed to a combustor where it is burned to provide thermal energy which is recycled to the methane decomposition step.

3. The process of claim 1, wherein the thermal energy produced from the second residue is recycled to both the drying stage and mild gasification stage of treatment.

4. The process of claim 1, wherein the methane is decomposed to carbon and hydrogen at a temperature of at least about 1100° C.

5. The process of claim 4, wherein the hydrogen formed by the decomposition of methane is recycled to the third stage for the conversion of char residue to methane.

6. In a system for the production of value-added coproducts from coal, the process which comprises:

subjecting coal to a drying treatment as a first stage by heating said coal to a temperature of about 95° C. to 250° C. for a time sufficient to remove substantially only moisture therefrom, treating said dried coal in a second stage by heating it to an elevated temperature of about 400° C. to 700° C. under non-oxidizing conditions for a time sufficient to remove volatile matter therefrom and produce fuel gas and condensible matter comprising pitch and oil and form a char as a first residue, condensing said condensible matter to form said pitch and oil, converting said char residue to methane in a third stage by treating said residue with hydrogen at a temperature of about 700° C. to 1000° C. conducive to methane formation and thereby leave a combustible second residue thereof, thermally decomposing said methane at a temperature of at least about 1100° C. to form pure carbon and hydrogen, recycling said hydrogen to said third stage to convert said char residue to methane, and subjecting said second residue remaining from the hydrogen-treated char to combustion to produce thermal energy for recycle into said system.

* * * * *